(12) United States Patent
Marchesan

(10) Patent No.: US 10,130,034 B2
(45) Date of Patent: Nov. 20, 2018

(54) SUGAR-CANE HARVESTER HAVING A TUBULAR FRAME

(71) Applicant: Marchesan Implementos e Máquinas Agrícolas Tatu S.A., Matão SP (BR)

(72) Inventor: Jose Luiz Alberto Marchesan, Matao (BR)

(73) Assignee: Marchesan Implementos e Máquinas Agrícolas Tatu S.A., Matao-SP (BR)

( * ) Notice: Subject to any disclaimer, the term of this patent is extended or adjusted under 35 U.S.C. 154(b) by 0 days.

(21) Appl. No.: 15/035,102

(22) PCT Filed: Nov. 6, 2014

(86) PCT No.: PCT/BR2014/050007
§ 371 (c)(1),
(2) Date: May 6, 2016

(87) PCT Pub. No.: WO2015/066783
PCT Pub. Date: May 14, 2015

(65) Prior Publication Data
US 2016/0278291 A1   Sep. 29, 2016

(30) Foreign Application Priority Data

Nov. 6, 2013 (BR) ............................. 020130286184

(51) Int. Cl.
*A01B 59/06* (2006.01)
*A01B 59/043* (2006.01)
(Continued)

(52) U.S. Cl.
CPC ............. *A01D 45/10* (2013.01); *A01D 57/22* (2013.01); *A01D 61/02* (2013.01)

(58) Field of Classification Search
CPC ...... A01D 45/10; A01D 45/003; A01D 47/00; G05B 2219/45003; Y10S 180/90; B62D 23/005; B62D 21/00; B62D 63/025
See application file for complete search history.

(56) References Cited

U.S. PATENT DOCUMENTS 2,648,943 A * 8/1953 Shafer ................... A01D 45/10
56/11.9
2,974,464 A * 3/1961 Thornton ............... A01D 45/10
56/16.6
(Continued)

FOREIGN PATENT DOCUMENTS

BR      8305505 A * 2/1985 ............. A01D 45/10
BR      9500633 A * 8/1997 ............. A01D 45/10
(Continued)

OTHER PUBLICATIONS

International Searching Authority, International Search Report and Written Opinion for International Application No. PCT/BR2014/050007, dated Apr. 20, 2015, 9 pages, European Patent Office, The Netherlands.

(Continued)

*Primary Examiner* — Arpad Fabian-Kovacs
(74) *Attorney, Agent, or Firm* — Alston & Bird LLP

(57) ABSTRACT

A sugar-cane harvester having a tubular frame is provided. The frame is configured for mounting a set of sugar-cane harvesting devices (2, 3, 4, 5, 6, 7, 8, 9,10), and is formed by a set of tubular parts linked mechanically to one another. The mechanical linking between the tubular parts that form the frame are made via at least one of rivets, soldering, or flanges. The frame may also be an exoskeleton-type frame configured for receiving all the components that form the industrial system of a sugar-cane harvester.

10 Claims, 1 Drawing Sheet

(51) Int. Cl.
  *A01B 63/02* (2006.01)
  *A01B 63/118* (2006.01)
  *A01D 45/10* (2006.01)
  *A01D 57/22* (2006.01)
  *A01D 61/02* (2006.01)

(56) References Cited

U.S. PATENT DOCUMENTS

| | | | | |
|---|---|---|---|---|
| 3,292,969 A * | 12/1966 | Eggert, Jr. | | B62D 23/005 24/30.5 W |
| 3,351,151 A * | 11/1967 | Miller, Jr. | | A01B 75/00 180/213 |
| 3,589,744 A * | 6/1971 | Hansen | | A01B 75/00 180/209 |
| 3,791,114 A * | 2/1974 | Fowler | | A01D 45/10 56/13.9 |
| 4,045,075 A * | 8/1977 | Pulver | | B62D 21/08 280/798 |
| 4,060,960 A * | 12/1977 | Hengen | | A01D 41/02 414/505 |
| 4,249,366 A * | 2/1981 | Dolberg | | A01D 43/082 56/119 |
| 4,271,661 A * | 6/1981 | Debuhr | | A01D 45/021 56/98 |
| 4,348,856 A * | 9/1982 | Copley | | A01D 46/08 56/13.6 |
| 4,483,131 A * | 11/1984 | Schlueter | | A01D 33/10 280/760 |
| 4,629,005 A * | 12/1986 | Hood, Jr. | | A01D 25/048 171/20 |
| 4,646,512 A * | 3/1987 | Scott | | A01D 45/10 56/13.9 |
| 5,332,281 A * | 7/1994 | Janotik | | B62D 21/02 296/203.03 |
| 6,016,877 A * | 1/2000 | Noonan | | B23K 33/00 172/776 |
| 6,688,803 B2 * | 2/2004 | Maria Van Giezen | | F16B 7/044 403/245 |
| 7,555,888 B1 * | 7/2009 | Boese | | A01D 45/00 56/327.1 |
| 7,681,388 B1 * | 3/2010 | Hinds | | A01D 41/1217 56/126 |
| 7,694,501 B1 * | 4/2010 | Hinds | | A01D 45/003 56/62 |
| 8,240,115 B2 * | 8/2012 | Marchini | | A01D 45/10 56/63 |
| 2002/0011743 A1 * | 1/2002 | Tiziano | | B62D 23/00 296/190.08 |
| 2002/0175007 A1 * | 11/2002 | Strong | | B60J 1/008 180/54.1 |
| 2005/0257939 A1 * | 11/2005 | Taylor | | A01D 19/04 171/1 |
| 2006/0186699 A1 * | 8/2006 | Davis | | B60G 3/06 296/187.01 |
| 2007/0281523 A1 * | 12/2007 | Riley | | B62D 23/005 439/157 |
| 2008/0022648 A1 * | 1/2008 | Fox | | A01D 46/08 56/341 |
| 2008/0295476 A1 * | 12/2008 | Bertino | | A01D 29/00 56/122 |
| 2010/0102596 A1 * | 4/2010 | Chapman | | A61G 3/00 296/193.03 |
| 2010/0307121 A1 * | 12/2010 | Marchini | | A01D 45/10 56/63 |
| 2013/0015012 A1 * | 1/2013 | Wu | | B62D 21/00 180/312 |
| 2013/0056293 A1 * | 3/2013 | Schurna | | B62D 23/005 180/68.5 |
| 2013/0319785 A1 * | 12/2013 | Spindler | | B62D 23/005 180/292 |
| 2015/0327437 A1 * | 11/2015 | Mixon | | A01D 45/10 56/16.4 C |
| 2015/0331408 A1 * | 11/2015 | Richard | | A01D 45/10 700/114 |
| 2015/0359177 A1 * | 12/2015 | Richard | | A01D 45/10 56/14.7 |
| 2016/0257360 A1 * | 9/2016 | MacKenzie | | B62D 21/11 |
| 2017/0043822 A1 * | 2/2017 | Gray | | B62D 63/062 |
| 2017/0101134 A1 * | 4/2017 | Miyazaki | | B62D 33/0617 |
| 2017/0280626 A1 * | 10/2017 | Bertino | | A01D 34/416 |

FOREIGN PATENT DOCUMENTS

| | | | | |
|---|---|---|---|---|
| CN | 203872556 U | * | 10/2014 | ............ A01C 9/00 |
| JP | 2000102314 A | * | 4/2000 | ............ A01D 45/10 |
| JP | 2009077695 A | * | 4/2009 | ............ A01D 45/10 |
| WO | WO 2009/095763 A2 | | 8/2009 | |
| WO | WO 2011/043744 A1 | | 4/2011 | |

OTHER PUBLICATIONS

International Preliminary Examining Authority (IPEA), Second Written Opinion for International Application No. PCT/BR2014/050007, dated Oct. 19, 2015, 5 pages, European Patent Office, Germany.

Marchesan Implementos E Máquinas Agrícolas Tatú S.A., Applicant's Reply to the Oct. 19, 2015 Second Written Opinion of the IPEA for International Application No. PCT/BR2014/050007, dated Dec. 11, 2015, 3 pages, Brazil.

International Preliminary Examining Authority, International Preliminary Report on Patentability, including Applicant's Sep. 3, 2015 Response to the ISA's Written Opinion for International Application No. PCT/BR2014/050007, dated Mar. 3, 2016, 10 pages, European Patent Office, Germany.

* cited by examiner

SUGAR-CANE HARVESTER HAVING A TUBULAR FRAME

CROSS REFERENCE TO RELATED APPLICATIONS

This application is a National Stage Application, filed under 35 U.S.C. 371, of International Application No. PCT/BR2014/050007 filed Nov. 6, 2014, which claims priority to Brazilian Application No. 10 2013 028618-4 filed Nov. 6, 2013, the contents of both of which as are hereby incorporated by reference in their entirety.

BACKGROUND

Related Field

The present invention relates to a sugar-cane harvester provided with a tubular frame of the exoskeleton type, on which the harvesting devices of the machine are mounted.

Description of Related Art

Harvesters known from the prior art make use of frames of different types, and may be built from simple, duplicated, folded, profiled, ribbed type, among other forms. In some cases, one uses tubes in parts isolated from the frame, which brings the need to use locks, interconnections and stiffeners. These prior-art frames are normally composed by putting together different components that end up determining the final shape or appearance of the harvester.

The prior-art frames have little mechanical elasticity, bringing, as their main disadvantage, the presence of cracks during the operation of the harvester, which ends up a great need for maintenance.

OBJECTIVES OF THE INVENTION

A first objective of the invention is to provide an entirely tubular, exoskeleton-type frame, which is capable of receiving all the components that form the industrial system of a sugar-cane harvester.

A second objective of the invention is to provide a frame for a sugar-cane harvester that has good strength, absorbing the stresses of operation of the machine without generating cracks and fissures.

BRIEF SUMMARY

The invention has the objective of providing a sugar-cane harvester comprising a frame adapted for mounting a set of sugar-cane harvesting devices, the frame being formed by a set of tubular parts linked mechanically to one another. The harvesting devices comprise at least one axle, wheels, base cutters and hasher, helical lifts, operator cabin, trash extractor, motor and hydraulic-pump actuating box.

According to a preferred embodiment of the invention, the tubular parts that form the frame have substantially circular, square or rectangular transverse section, the mechanical joining the tubular parts that form the frame being made by rivets, soldering and/or flanges.

BRIEF DESCRIPTION OF THE FIGURES

The present invention will now be described in greater detail with reference to an example of embodiment represented in the drawings. The FIGURES show.

DETAILED DESCRIPTION OF VARIOUS EMBODIMENTS

Figure 1:
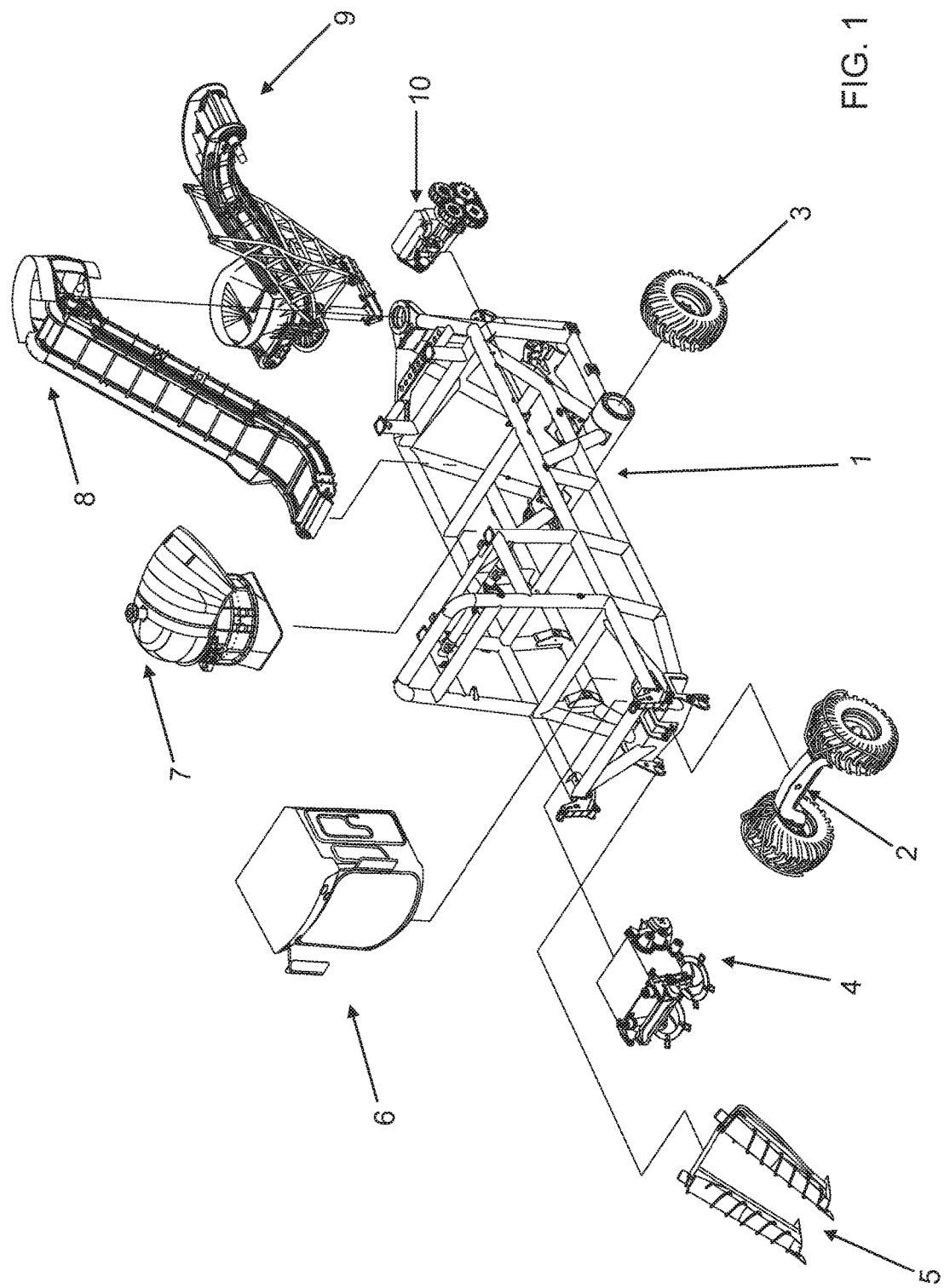
FIG. 1 is a perspective schematic view of the tubular frame of the invention, with indication of mounting of the usual harvesting devices of a sugar-cane harvester.

FIG. 1 shows the exoskeleton-type tubular frame 1 of the invention. The frame 1 is mounted as a single piece for a sugar-cane harvester, the frame 1 being formed by a set of tubes or tubular parts linked mechanically to one another by means of rivets, soldering processes, screwed flanges or any other adequately resistant mechanical means.

The tubular parts that compose the frame 1 may have any cross section, the circular, square or rectangular one being preferable.

As shown in FIG. 1, the frame 1 is designed for receiving the mechanical mounting of said industrial systems of a sugar-cane harvester. FIG. 1 shows the positions in which one can mount at least one axle 2, a set of wheels 3, base cutters and cane hasher 4, an operator cabin 6, a trash extractor 7, first and second conveyor belts 8, 9 for conveying hashed cane, and a diesel motor 10 with hydraulic-pump actuating box.

Of course, the industrial systems 2, 3, 4, 5, 6, 7, 8, 9, 10 illustrated in FIG. 1 are only examples and may vary according to the specific design of the sugar-cane harvesting machine.

The advantages of the frame 1 proposed herein are clear when compared with the harvesting machines known from the prior art. The frame 1 has great strength, being capable of absorbing torsions, contractions and dilations resulting from the stress to which it is subjected during the harvesting and/or moving process.

Thus, the enhanced strength of the frame 1, which is nothing else than the capability of receiving mechanical energy in an elastic regime, aids in solving the serious and persistent problem of cracks and fissures that damage prior-art sugar-cane harvesters so much.

A preferred example of embodiment having been described, one should understand that the scope of the present invention embraces other possible variations, being limited only by the contents of the accompanying claims, which include the possible equivalents.

The invention claimed is:

1. A sugar-cane harvester comprising:
   a frame (1); and
   a set of sugar-cane harvesting devices (2, 3, 4, 5, 6, 7, 8, 9, 10) mounted to the frame,
   wherein:
      the frame (1) is a single piece, the frame (1) consisting of a set of tubular parts linked to one another via one or more mechanical joints;
      the set of tubular parts that define the frame (1) have a substantially circular cross section;
      the frame (1) is an exoskeleton-type frame;
      the set of tubular parts comprises:
         a first subset oriented in a first plane and defining a first rectangular-shaped opening;
         a second subset oriented in a second plane and defining a second rectangular-shaped opening, the second plane being orthogonal to the first plane; and
         a third subset oriented in a third plane and defining a third rectangular-shaped opening, the third plane being orthogonal to both the first and second planes;

one tubular part within the set of tubular parts is common to both the first and the second subsets; and
another tubular part within the set of tubular parts is common to both the second and the third subsets.

2. The sugar-cane harvester of claim 1, wherein each of the tubular parts within each of the three subsets of the set of tubular parts that define the frame (1) are orthogonal to each of the other of the tubular parts within a particular one of the three subsets.

3. The sugar-cane harvester of claim 2, wherein the three subsets of the tubular parts include nine tubular parts, no more than any three of the nine tubular parts being parallel relative to one another.

4. The sugar-cane harvester of claim 3, wherein at least one of the three rectangular-shaped openings are configured to receive therein at least one of the set of sugar-cane harvesting devices (2, 3, 4, 5, 6, 7, 8, 9, 10).

5. The sugar-cane harvester of claim 2, wherein the three subsets of the tubular parts include eleven tubular parts, no more than any four of the eleven tubular parts being parallel relative to one another.

6. A sugar-cane harvester comprising:
a frame (1); and
a set of sugar-cane harvesting devices (2, 3, 4, 5, 6, 7, 8, 9, 10) mounted to the frame,
wherein:
the frame (1) is a single piece, the frame (1) being defined by a set of tubular parts linked to one another via one or more mechanical joints;
the set of tubular parts that define the frame (1) comprises three subsets of tubular portions, the first subset being oriented in a first plane and defining a first rectangular-shaped opening, the second subset being oriented in a second plane orthogonal to the first plane and defining a second rectangular-shaped opening, the third subset being oriented in a third plane orthogonal to both the first and second planes and defining a third rectangular-shaped opening;
one tubular portion within the set of tubular parts is common to both the first and the second subsets;
another tubular portion within the set of tubular parts is common to both the second and the third subsets; and
the set of tubular parts that define the frame (1) have a substantially circular cross section.

7. The sugar-cane harvester of claim 6, wherein the three subsets of the tubular parts include nine tubular parts, no more than any three of the nine tubular parts being parallel relative to one another.

8. The sugar-cane harvester of claim 7, wherein at least one of the three rectangular-shaped openings are configured to receive therein at least one of the set of sugar-cane harvesting devices (2, 3, 4, 5, 6, 7, 8, 9, 10).

9. The sugar-cane harvester of claim 6, wherein the three subsets of the tubular parts include eleven tubular parts, no more than any four of the eleven tubular parts being parallel relative to one another.

10. The sugar-cane harvester of claim 6, wherein the frame (1) is an exoskeleton-type frame.

* * * * *

UNITED STATES PATENT AND TRADEMARK OFFICE
CERTIFICATE OF CORRECTION

PATENT NO. : 10,130,034 B2  
APPLICATION NO. : 15/035102  
DATED : November 20, 2018  
INVENTOR(S) : Marchesan Page 1 of 1

It is certified that error appears in the above-identified patent and that said Letters Patent is hereby corrected as shown below:

On the Title Page

Item (30) Foreign Application Priority Data:  
Delete "020130286184" and insert --1020130286184--

Signed and Sealed this  
Fifth Day of February, 2019

Andrei Iancu  
*Director of the United States Patent and Trademark Office*